United States Patent
Hirai et al.

(10) Patent No.: US 7,257,710 B2
(45) Date of Patent: Aug. 14, 2007

(54) ADDITIONAL-DATA EMBEDDING APPARATUS AND ADDITIONAL-DATA EMBEDDING METHOD

(75) Inventors: Jun Hirai, Tokyo (JP); Yoonki Choi, Tokyo (JP)

(73) Assignee: Sony Corporation (JP)

(*) Notice: Subject to any disclaimer, the term of this patent is extended or adjusted under 35 U.S.C. 154(b) by 730 days.

(21) Appl. No.: 10/223,532

(22) Filed: Aug. 19, 2002

(65) Prior Publication Data
US 2003/0053628 A1 Mar. 20, 2003

(30) Foreign Application Priority Data
Aug. 21, 2001 (JP) ............... 2001-250088

(51) Int. Cl.
*H04L 9/00* (2006.01)
*H04N 7/167* (2006.01)

(52) U.S. Cl. .............. 713/176; 713/173; 380/232; 380/238

(58) Field of Classification Search ........ 713/169–183; 380/238, 232
See application file for complete search history.

(56) References Cited

U.S. PATENT DOCUMENTS

| | | | | |
|---|---|---|---|---|
| 3,651,268 A | * | 3/1972 | Rivkin | 380/253 |
| 5,073,925 A | * | 12/1991 | Nagata et al. | 360/60 |
| 5,216,724 A | * | 6/1993 | Suzuki et al. | 382/135 |
| 5,319,735 A | * | 6/1994 | Preuss et al. | 704/205 |
| 5,530,759 A | * | 6/1996 | Braudaway et al. | 380/54 |
| 5,568,570 A | * | 10/1996 | Rabbani | 382/238 |
| 5,613,004 A | * | 3/1997 | Cooperman et al. | 380/28 |
| 5,646,997 A | * | 7/1997 | Barton | 713/176 |
| 5,664,018 A | * | 9/1997 | Leighton | 380/54 |
| 5,748,763 A | | 5/1998 | Rhoads | |

(Continued)

FOREIGN PATENT DOCUMENTS

JP    11-284836 A    10/1999

(Continued)

OTHER PUBLICATIONS

Ingemar J. Cox, Joe Kilian, Tom Leighton, and Talal Shamoon: A Secure, Robust Watermark for Multimedia, (May 1996).*

(Continued)

*Primary Examiner*—Nasser Moazzami
*Assistant Examiner*—Mohammad Reza
(74) *Attorney, Agent, or Firm*—Lerner, David, Littenberg, Krumholz & Mentlik, LLP

(57) ABSTRACT

The present invention provides an additional-watermark embedding apparatus for embedding predetermined additional data into original data. The additional-watermark embedding apparatus includes an adder for summing the original data and the additional data, a first amplifier for amplifying the original data according to a predetermined non-linear input-output characteristic, a second amplifier for amplifying the summed data supplied from the adder according to a predetermined non-linear input-output characteristic, a subtractor for taking the difference between the amplified data obtained by the second amplifier and the amplified original data obtained by the first amplifier, and an embedder for embedding modified additional data which is obtained by modifying the waveform of the additional data according to the original data and which is supplied from the subtractor into the original data.

22 Claims, 5 Drawing Sheets

U.S. PATENT DOCUMENTS

| | | | |
|---|---|---|---|
| 5,809,139 A * | 9/1998 | Girod et al. | 380/202 |
| 5,825,892 A * | 10/1998 | Braudaway et al. | 380/51 |
| 5,848,155 A * | 12/1998 | Cox | 382/191 |
| 5,859,920 A * | 1/1999 | Daly et al. | 382/115 |
| 5,889,868 A * | 3/1999 | Moskowitz et al. | 713/176 |
| 5,915,027 A * | 6/1999 | Cox et al. | 380/54 |
| 6,031,914 A * | 2/2000 | Tewfik et al. | 380/54 |
| 6,037,984 A * | 3/2000 | Isnardi et al. | 375/240.21 |
| 6,061,793 A * | 5/2000 | Tewfik et al. | 713/176 |
| 6,154,571 A * | 11/2000 | Cox et al. | 382/250 |
| 6,233,347 B1 * | 5/2001 | Chen et al. | 382/100 |
| 6,240,121 B1 * | 5/2001 | Senoh | 375/130 |
| 6,246,439 B1 * | 6/2001 | Zink et al. | 348/473 |
| 6,341,350 B1 * | 1/2002 | Miyahara et al. | 713/176 |
| 6,359,573 B1 * | 3/2002 | Taruguchi et al. | 341/50 |
| 6,385,329 B1 * | 5/2002 | Sharma et al. | 382/100 |
| 6,434,322 B1 * | 8/2002 | Kimura et al. | 386/94 |
| 6,522,771 B2 * | 2/2003 | Rhoads | 382/100 |
| 6,526,385 B1 * | 2/2003 | Kobayashi et al. | 704/504 |
| 6,782,191 B1 * | 8/2004 | Ikeda et al. | 386/94 |
| 6,823,074 B1 * | 11/2004 | Sugaya et al. | 382/100 |
| 2002/0027994 A1 * | 3/2002 | Katayama et al. | 380/269 |
| 2002/0150247 A1 * | 10/2002 | Linnartz et al. | 380/205 |

FOREIGN PATENT DOCUMENTS

JP      2000-270204 A      9/2000

OTHER PUBLICATIONS

V. Darmstaedter, J. F. Delaigle, D. Nicholson, B. Macq: Low Cost Watermarking Technique Optimized by Tests in Real Conditions and Simulations.*

* cited by examiner

ADDITIONAL-DATA EMBEDDING APPARATUS AND ADDITIONAL-DATA EMBEDDING METHOD

BACKGROUND OF THE INVENTION

1. Field of the Invention

The present invention relates to an additional-data embedding apparatus and additional-data embedding method for embedding additional data into original-work data, such as image data, using so-called digital watermarking.

2. Description of the Related Art

With the recent popularity of recording media such as CDs (Compact Discs), MDs (Mini Discs), and DVDs (Digital Versatile Disks), and the Internet, there has been a problem in that copyright is violated by illegally copying someone's work or digital data, which is said to be easily duplicated or altered. In order to address the problem, for example, a so-called digital watermark (or digital data embedding or digital data hiding) technique has been proposed, which is a technique to embed additional information including copy control information for digital data, such as "COPY ONCE" or "NEVER COPY", and copyright information indicating the copyright holder into original data including image data for still images or moving pictures, and audio data for sound or music.

In digital watermarking, for example, when additional data is embedded into image data, the additional data is invisible while maintaining the quality of the original image data. When additional data is embedded into audio data, the additional data is inaudible while maintaining the quality of the original audio data.

Additional data embedded as digital watermark information into original data is detected by a recording device when the original data is copied. In digital watermarking, therefore, various information such as data distributing routes, the presence or absence of a license, and copy control information can be detected based on the detected additional data, thereby preventing the original data from being illegally copied.

As requirements for digital watermarking, first, the embedded additional data should be imperceptible (e.g., invisible, inaudible, etc.); and, second, if data having additional data embedded therein is artificially modified by a third party, the embedded additional data should be robust. These requirements are conflicting. In general, such a digital-watermark embedding technique using information processing technology is designed so that additional data is strongly embedded into a perceptible region of the original data and is weakly embedded into an imperceptible region of the original data.

For example, for digitally watermarking a still image, additional data WM having a value of ±1, and luminance for image data I are summed to obtain watermarked image data I'. For digital watermarking, furthermore, as expressed in the following Equation (1), the additional data WM may be multiplied by $\alpha \cdot I$, which depends upon the pixel value into which the additional data WM is to be embedded, thereby changing the embedding strength of the additional data WM:

$$I' = I + \alpha \cdot I \cdot WM \qquad (1)$$

This uses the property of the human visual system that, in a region having a higher pixel luminance, a change to that pixel is less perceptible on a display device.

U.S. Pat. No. 5,748,763 assigned to Digimarc Corporation discloses a digital watermarking technique which can be implemented by a digital-watermark embedding apparatus 100 shown in FIG. 9. The digital-watermark embedding apparatus 100 includes two modulators 101 and 102, and an embedder 103 having an adder. The digital-watermark embedding apparatus 100 supplies to the first modulator 101 both original image data I and additional data WM to be embedded, where the embedding strength of the additional data WM for each region of the original image data I, called a local parameter, is computed with functions according to the luminance of a region into which the additional data WM is to be embedded. The additional data WM is then modulated by the modulator 101. The digital-watermark embedding apparatus 100 supplies the additional data WM modulated by the modulator 101 to the second modulator 102, where the embedding strength of the additional data WM for the overall original image data I, called a global parameter, is determined. The additional data WM is then modulated by the modulator 102. The digital-watermark embedding apparatus 100 embeds the additional data WM, which is level-controlled by the modulator 102, into the original data using the embedder 103, and outputs the image data I' having the additional data WM embedded therein.

In the above technique, therefore, depending upon the properties of the image data I, additional data WM is modulated by the modulator 101, and the embedding strength of the additional data WM with respect to the overall image data I is determined by the modulator 102, after which the additional data WM is embedded.

In the above-described technique, if the embedding strength of the additional data WM is changed depending upon the original image data I, calculations such as multiplications and functional equations must be performed, thus increasing the power consumption of a CPU (central processing unit) when the apparatus 100 is implemented by software, or increasing the size and complexity of the circuit if the apparatus 100 is implemented by hardware. In particular, if the embedding strength of the additional data WM is changed depending upon the original image data I, this technique would only need to store, as a reference table, the embedding strength of the additional data WM depending upon the original image data I in a storage unit without using either the global parameter or the local parameter; however, in fact, the calculation is performed using both the global parameter and the local parameter, thus increasing the complexity of the processing.

SUMMARY OF THE INVENTION

In view of such a background, it is an object of the present invention to provide an additional-data embedding apparatus and additional-data embedding method, whereby the embedding strength of additional data can quickly and easily be determined based on original data and the additional data so that the additional data cannot be detected by a third party, and additional data having high performance such as robustness to attacks can be embedded.

The foregoing object is achieved by an aspect of the present invention through the provision of an additional-data embedding apparatus for embedding predetermined additional data into original data. The additional-data embedding apparatus includes an adding unit, first and second amplifying units, a subtracting unit, and an embedding unit. The adding unit sums the original data and the additional data. The first amplifying unit amplifies the original data based upon a predetermined non-linear input-output characteristic. The second amplifying unit amplifies the summed data supplied from the adding unit based upon a predetermined non-linear input-output characteristic. The subtracting unit takes the difference between the amplified data obtained by the second amplifying unit and the amplified original data obtained by the first amplifying unit. The embedding unit embeds modified additional data supplied from the subtracting unit into the original data, the modified additional data being produced by modifying the waveform of the additional data according to the original data.

In the additional-data embedding apparatus, accordingly, first and second amplifying units each having a non-linear input-output characteristic are used to modify the waveform of additional data according to original data, and the resulting modified additional data is embedded by an embedding unit into the original data. Therefore, additional data having high performance such as robustness to attacks can be quickly and easily embedded into original data without performing multiplication or functional equation.

The foregoing object is further achieved by another aspect of the present invention through the provision of an additional-data embedding method of embedding predetermined additional data into original data. The additional-data embedding method includes an adding step of summing the original data and the additional data; a first amplifying step of amplifying the original data based upon a predetermined non-linear input-output characteristic; a second amplifying step of amplifying the summed data obtained in the adding step based upon a predetermined non-linear input-output characteristic; a subtracting step of taking the difference between the amplified data obtained in the second amplifying step and the amplified original data obtained in the first amplifying step; and an embedding step of embedding modified additional data obtained in the subtracting step into the original data, the modified additional data being produced by modifying the waveform of the additional data according to the original data.

In the additional-data embedding method, accordingly, the waveform of additional data is modified according to original data based on a non-linear input-output characteristic, and the resulting modified additional data is embedded into the original data. Therefore, additional data having high performance such as robustness to attacks can be quickly and easily embedded into original data without performing multiplication or functional equation.

The foregoing object is further achieved by still another aspect of the present invention through the provision of an additional-data embedding apparatus for embedding predetermined additional data into original data. The additional-data embedding apparatus includes a transforming unit, an adding unit, first and second amplifying units, a subtracting unit, an inverse transforming unit, and an embedding unit. The transforming unit performs predetermined transformation on the original data. The adding unit sums the transformed data obtained by the predetermined transformation performed by the transforming unit and the additional data. The first amplifying unit amplifies the transformed data based upon a predetermined non-linear input-output characteristic. The second amplifying unit amplifies the summed data supplied from the adding unit based upon a predetermined non-linear input-output characteristic. The subtracting unit takes the difference between the amplified data obtain by the second amplifying unit and the amplified original data obtain by the first amplifying unit. The inverse transforming unit performs inverse transformation on the modified additional data obtained by the subtracting unit, the inverse transformation being inverse to the transformation performed by the transforming unit. The embedding unit embeds the modified additional data obtained by the inverse transforming unit into the original data.

In the additional-data embedding apparatus, accordingly, predetermined transformation is performed on original data, and first and second amplifying units each having a non-linear input-output characteristic are used to modify the waveform of additional data according to the original data. Then, the resulting modified additional data is embedded into the original data using an embedding unit. Therefore, additional data having high performance such as robustness to attacks can be quickly and easily embedded into original data without performing multiplication or functional equation.

The foregoing object is further achieved by still another aspect of the present invention through the provision of an additional-data embedding method of embedding predetermined additional data into original data. The additional-data embedding method includes a transforming step of performing predetermined transformation on the original data; an adding step of summing the transformed data obtained by the predetermined transformation performed in the transforming step and the additional data; a first amplifying step of amplifying the transformed data based upon a predetermined non-linear input-output characteristic; a second amplifying step of amplifying the summed data obtained in the adding step based upon a predetermined non-linear input-output characteristic; a subtracting step of taking the difference between the amplified data obtain in the second amplifying step and the amplified original data obtain in the first amplifying step; an inverse transforming step of performing inverse transformation on the modified additional data obtained in the subtracting step, the inverse transformation being inverse to the transformation performed in the transforming step; and an embedding step of embedding the modified additional data obtained in the inverse transforming step into the original data.

In the additional-data embedding method, accordingly, predetermined transformation is performed on original data, and the waveform of additional data is modified according to the original data based on a non-linear input-output characteristic. The resulting modified additional data is then embedding into the original data. Therefore, additional data having high performance such as robustness to attacks can be quickly and easily embedded into original data without performing multiplication or functional equation.

DESCRIPTION OF THE PREFERRED EMBODIMENTS

Some embodiments of the present invention are now specifically described with reference to the drawings.

The present invention provides a digital-watermark embedding (or digital-data embedding or digital-data hiding) apparatus which performs predetermined frequency-transformation on original image data to embed additional data, such as copy control information for digital data and copyright information indicating the copyright holder, as a so-called digital watermark, into the resulting frequency transform coefficients. The digital-watermark embedding apparatus modifies the waveform of additional data according to the visual characteristic of original image data to embed the digital watermark. A non-linear circuit is used to simplify the circuit.

A digital-watermark embedding apparatus according to a first embodiment of the present invention is now described.

Figure 1:
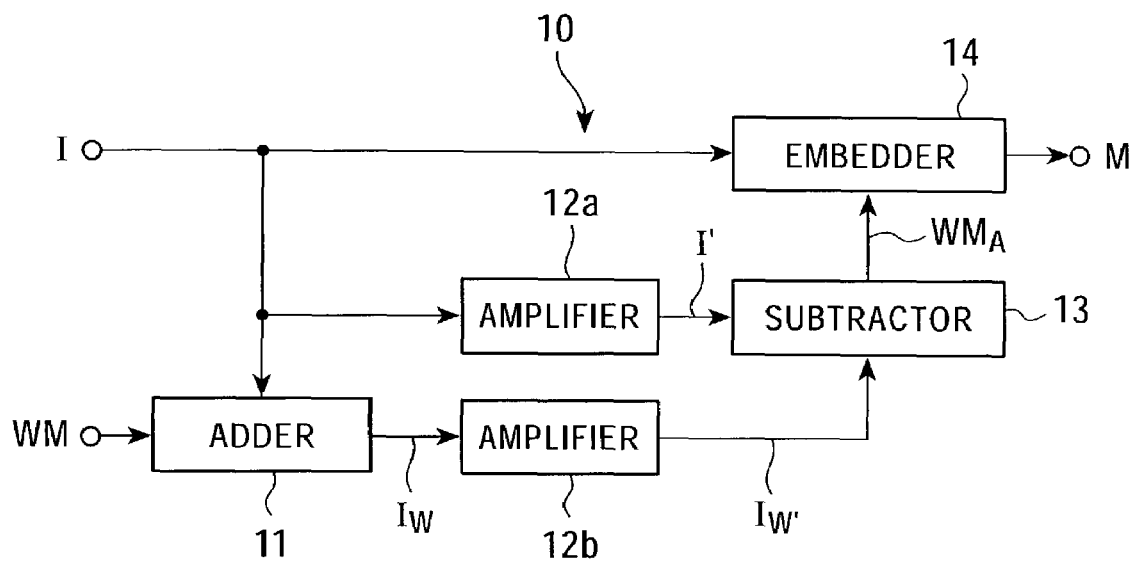
FIG. 1 is a block diagram of a digital-watermark embedding apparatus according to a first embodiment of the present invention.

Referring to FIG. 1, a digital-watermark embedding apparatus 10 according to the first embodiment includes an adder 11 for summing incoming original image data I and additional data WM; a first amplifier 12a for amplifying the incoming original image data I; a second amplifier 12b for amplifying the summed image data $I_W$ obtained by the adder 11; a subtractor 13 for taking the difference between the amplified image data $I_W'$ obtained by the amplifier 12b and the amplified original image data I' obtained by the amplifier 12a; and an embedder 14 for embedding the modified additional data $WM_A$ obtained by the subtractor 13 into the original image data I.

The digital-watermark embedding apparatus 10 may be implemented not only by hardware but also by software. If the digital-watermark embedding apparatus 10 is implemented by software, an embedding program for embedding a digital watermark is executed by a CPU (central processing unit) in a personal computer or a variety of electronic equipment capable of handling image data to achieve a functionality corresponding to the individual components. The embedding program may be provided in a predetermined recording medium such as a compact disc, or may be downloaded via a transmission medium such as the Internet.

The adder 11 sums the original image data I and the additional data WM. For example, the adder 11 adds the additional data WM multiplied by constant β to the original image data I, as described in the following Equation (2):

$$I_W = I + \beta \cdot WM \quad (2)$$

The summed image data $I_W$ found by Equation (2) is identical to image data having the additional data WM embedded therein without the properties of the original image data I taken into account. In place of calculation of Equation (2), the adder 11 may add the original image data I multiplied by constant β to the additional data WM, as described in the following Equation (3):

$$I_W = \beta \cdot I + WM \quad (3)$$

Figure 2:
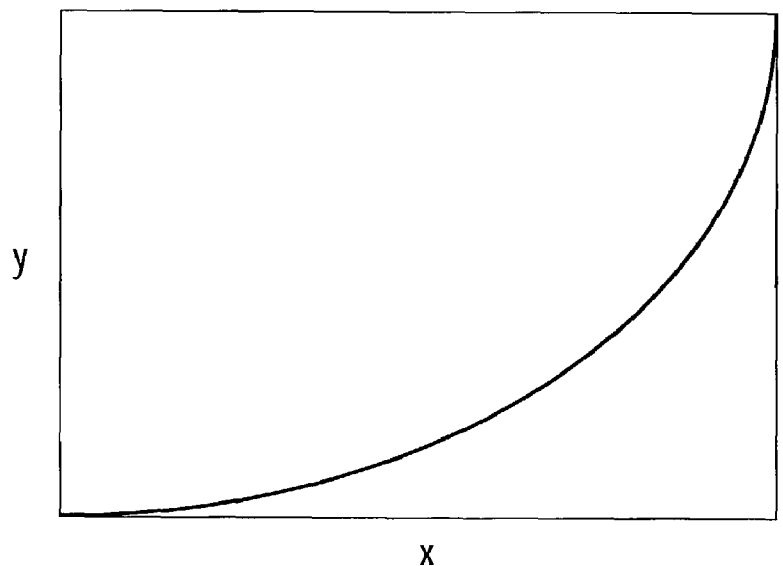
FIG. 2 is a graph depicting an input-output characteristic curve of each amplifier in the digital-watermark embedding apparatus shown in FIG. 1.

Meanwhile, the amplifier 12a amplifies the original image data I according to a predetermined characteristic. The amplifier 12b amplifies the summed image data $I_W$ supplied from the adder 11 according to a predetermined characteristic. For example, the input-output characteristic of each of the amplifiers 12a and 12b is depicted as a characteristic curve in FIG. 2. This characteristic curve is computed with functions as follows:

$$y = x^2/2 \quad (4)$$

In other words, each of the amplifiers 12a and 12b exhibits a non-linear input-output characteristic. For instance, when luminance of image data is input, the amplifiers 12a and 12b output the square root of the luminance. The amplifiers 12a and 12b may also amplify the image data according to any other characteristic curve than the characteristic curve computed with functions in Equation (4). A technique to compute a characteristic curve is described below. For convenience of illustration, in the following discussion, the input-output characteristic of each of the amplifiers 12a and 12b is described by Equation (4).

The digital-watermark embedding apparatus 10 may also include a storage unit for storing, as a reference table, amplifier values for the original image data I and the additional data WM. The amplifiers 12a and 12b may refer to the reference table stored in the storage unit to amplify the original image data I and the summed image data $I_W$, respectively.

The amplifier 12a supplies the amplified original image data I' to the subtractor 13, and the second amplifier 12b supplies the amplified image data $I_W'$ to the subtractor 13.

The subtractor 13 takes the difference between the amplified image data $I_W'$ and the amplified original image data I'. That is, the subtractor 13 performs computation expressed by the following Equation (5):

$$\begin{aligned} WM_A &= I_W' - I' \\ &= I_W^2/2 - I^2/2 \\ &= (I + \beta \cdot WM)^2/2 - I^2/2 \\ &= \beta \cdot I \cdot WM + \beta^2 \cdot WM^2/2 \end{aligned} \quad (5)$$

As a result, the output from the subtractor 13 is the modified additional data $WM_A$ obtained by modifying the waveform of the additional data WM according to the original image data I. The modified additional data $WM_A$ is supplied to the embedder 14.

In Equation (5), the value of β·I is selected to be as sufficiently small as about $\frac{1}{100}$ the value of I in order to ensure invisibility of the digital watermark. Then, the value of $\beta^2 \cdot WM^2/2$ is small enough to be negligible. The subtractor 13 may take the difference between the amplified image data $I_W'$ supplied from the amplifier 12b and the amplified original image data I' supplied from the amplifier 12a, which are level-shifted by $\beta^2 \cdot WM^2/2$; or, otherwise, may level-shift the value determined by Equation (5) by $\beta^2 \cdot WM^2/2$ before supplying the result as modified additional data $WM_A$ to the embedder 14. In any instance, if the original image data I is a still image, the output from the subtractor 13 is the modified additional data $WM_A$ obtained by modifying the waveform of the additional data WM according to the luminance of the original image data I.

As is apparent from Equations (4) and (5), Equation (5) is expressed as the differential of Equation (4). That is, the input-output characteristic of each of the amplifiers 12a and 12b may be designed so as to satisfy a desired integrated result of the waveform-modified version of the additional data WM.

The embedder 14 embeds the modified additional data $WM_A$ supplied from the subtractor 13 into the original image data I, and outputs the resulting data as image data M. For instance, the embedder 14 adds and embeds to the original image data I the modified additional data $WM_A$ obtained by modifying the waveform of the additional data WM according to the original image data I, as described in Equation (6):

$$M = I + WM_A \qquad (6)$$

Substituting Equation (5) for Equation (6), then the following Equation (7) is found:

$$\begin{aligned} M &= I + WM_A \\ &= I + \beta \cdot I \cdot WM + \beta^2 \cdot WM^2 /2 \\ &\approx I + \beta \cdot I \cdot WM \end{aligned} \qquad (7)$$

As is apparent from Equation (7), in the digital-watermark embedding apparatus 10, the additional data WM, whose waveform is modified according to the luminance of the original image data I, is embedded into the original image data I.

The digital-watermark embedding apparatus 10 uses the amplifiers 12a and 12b each having a non-linear characteristic to modify the waveform of the additional data WM according to the original image data I, and embeds the additional data WM into the original image data I. This equivalently means that, if the luminance of a still image is input as original image data I, the digital-watermark embedding apparatus 10 embeds the additional data WM with the amplitude of additional data WM that increases as the luminance of the still image becomes higher, in other words, as the still image becomes brighter. This is due to the property of the human visual system being more sensitive to changes in dark regions than in bright regions. The digital-watermark embedding apparatus 10 uses such a property to change the embedding strength of the additional data WM depending upon the original image data I before embedding the additional data WM.

The digital-watermark embedding apparatus 10 therefore prevents degradation in quality of a watermarked image from being detected by a third party, thus increasing the robustness to attack by the third party for unauthorized use.

Furthermore, the digital-watermark embedding apparatus 10 requires no multiplier, thus reducing the power consumption of the CPU if implemented by software, as well as reducing the size and complexity of the circuit for high-speed processing if implemented by hardware.

A digital-watermark embedding apparatus 20 according to a second embodiment of the present invention is now described with reference to FIG. 3. The digital-watermark embedding apparatus 20 performs frequency-transformation on original image data I, and modifies the waveform of the additional data WM according to the obtained frequency coefficients in the frequency domain, which is then embed into original image data I.

Figure 3:
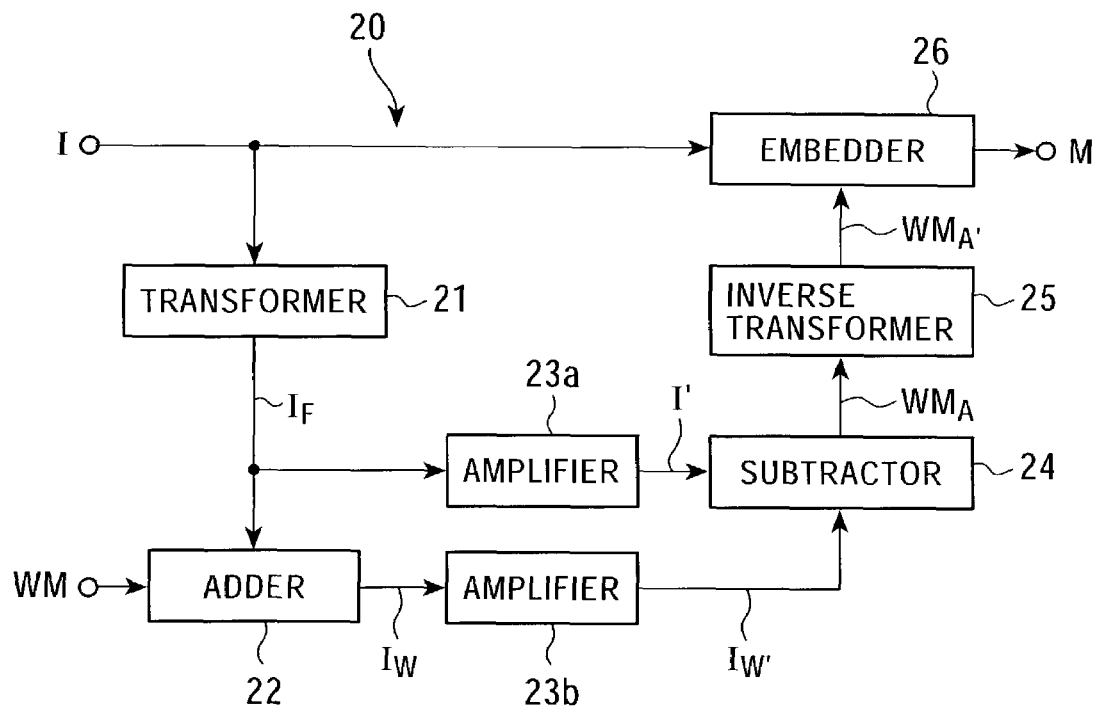
FIG. 3 is a block diagram of a digital-watermark embedding apparatus according to a second embodiment of the present invention.

Referring to FIG. 3, the digital-watermark embedding apparatus 20 includes a transformer 21 for performing frequency-transformation on incoming original image data I; an adder 22 for summing the frequency-coefficient data $I_F$, which is transformed data obtained by the transformer 21, and additional data WM; a first amplifier 23a for amplifying the frequency-coefficient data $I_F$ obtained by the transformer 21; a second amplifier 23b for amplifying the summed coefficient data $I_W$ obtained by the adder 22; a subtractor 24 for taking the difference between the amplified coefficient data $I_W'$ obtained by the amplifier 23b and the amplified original coefficient data I' obtained by the amplifier 23a; an inverse transformer 25 for performing inverse frequency-transformation on the modified additional data $WM_A$ obtained by the subtractor 24; and an embedder 26 for embedding the modified additional data $WM_A'$ obtained by the inverse transformer 25 into the original image data I.

The digital-watermark embedding apparatus 20 may be implemented not only by hardware but also by software. If the digital-watermark embedding apparatus 20 is implemented by software, an embedding program for embedding a digital watermark is executed by a CPU in a personal computer or a variety of electronic equipment capable of handling image data to achieve a functionality corresponding to the individual components. The embedding program may be provided in a predetermined recording medium such as a compact disc, or may be downloaded via a transmission medium such as the Internet.

The transformer 21 performs frequency-transformation on the original image data I in the time domain or space domain so as to be in a frequency-domain form to find frequency-coefficient data $I_F$. The transformer 21 may be implemented by any frequency transform such as a Fourier transform, a wavelet transform, a discrete cosine transform (hereinafter abbreviated as "DCT"), mDCT, or a fractal transform. The transformer 21 supplies the frequency-coefficient data $I_F$ obtained after frequency transformation to both the adder 22 and the amplifier 23a. The transformer 21 may output all the resulting frequency coefficients as frequency-coefficient data $I_F'$ or may select and output a specific frequency coefficient, as described below.

The adder 22 sums the frequency-coefficient data $I_F$ supplied from the transformer 21 and the additional data WM. The additional data WM is a frequency-domain signal in the transformer 21. For example, the adder 22 adds the additional data WM multiplied by constant $\beta$ to the frequency-coefficient data $I_F$, as described in the following Equation (8):

$$I_W = I_F + \beta \cdot WM \qquad (8)$$

Then, the adder 22 supplies the resulting summed coefficient data $I_W$ to the amplifier 23b.

Meanwhile, the amplifier 23a amplifies the frequency-coefficient data $I_F$ according to a predetermined characteristic. The amplifier 23b amplifies the summed coefficient data $I_W$ supplied from the adder 22 according to a predetermined characteristic. The amplifiers 23a and 23b each exhibit a non-linear input-output characteristic, as in the above-described amplifiers 12a and 12b in the digital-watermark embedding apparatus 10. The amplifier 23a supplies the amplified original coefficient data I' to the subtractor 24, and the amplifier 23b supplies the amplified coefficient data $I_W'$ to the subtractor 24.

The subtractor 24 takes the difference between the amplified coefficient data $I_W'$ and the amplified original coefficient data I', as described in Equation (5). As a result, the output from the subtractor 24 is the modified additional data $WM_A$ obtained by modifying the waveform of the additional data WM according to the original image data I. The modified additional data $WM_A$ is supplied to the inverse transformer 25.

The inverse transformer 25 performs inverse frequency-transformation on the modified additional data $WM_A$ in the frequency-domain form, which is inverse to the frequency-transformation performed by the transformer 21, to find modified additional data $WM_A'$ in the original time-domain or space-domain form. The inverse transformer 25 supplies to the embedder 26 the modified additional data $WM_A'$ obtained after inverse frequency-transformation.

The embedder 26 embeds the modified additional data $WM_A'$ supplied from the inverse transformer 25 into the original image data I in a similar manner to the above-described embedder 14 in the digital-watermark embedding apparatus 10, and outputs the resulting data as image data M.

Accordingly, the digital-watermark embedding apparatus 20 performs frequency-transformation on incoming original image data I in the transformer 21, and modifies the waveform of the additional data WM according to the original image data I, which is then embedded into the original image data I. This equivalently means that, if the luminance of a still image is input as original image data I, when the low-frequency components in the luminance are output as frequency-coefficient data $I_F$ by the transformer 21, the digital-watermark embedding apparatus 20 embeds the additional data WM with the amplitude of additional data WM that increases as the luminance of the still image becomes higher, in other words, as the still image becomes brighter. This is due to the property of the human visual system being more sensitive to changes in dark regions than in bright regions. Further, this equivalently means that, if the luminance of a still image is input as original image data I, when the high-frequency components in the luminance are output as frequency-coefficient data $I_F$ by the transformer 21, the digital-watermark embedding apparatus 20 embeds the additional data WM with the amplitude of additional data WM that increases as the variation in the luminance of the still image becomes greater, in other words, as the still image has stronger edges. This is due to the property of the human visual system being more sensitive to changes in edge regions than in uniform regions. The digital-watermark embedding apparatus 20 uses such properties to change the embedding strength of the additional data WM depending upon the original image data I before embedding the additional data WM.

The digital-watermark embedding apparatus 20 therefore prevents degradation in quality of a watermarked image from being detected by a third party, thus increasing the robustness to attack by the third party for unauthorized use.

Furthermore, the digital-watermark embedding apparatus 20 requires no multiplier, thus reducing the power consumption of the CPU if implemented by software, as well as reducing the size and complexity of the circuit for high-speed processing if implemented by hardware.

Specific implementations of the digital-watermark embedding apparatus 20 are now described with reference to FIGS. 4 to 8.

Figure 4:
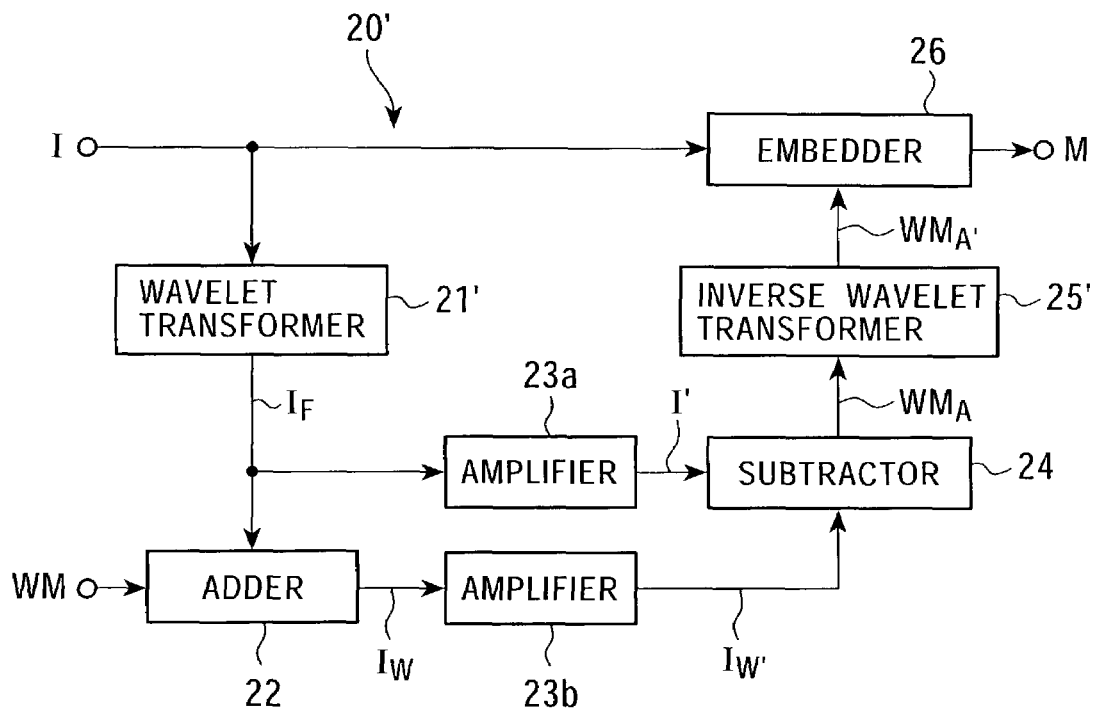
FIG. 4 is a block diagram of a digital-watermark embedding apparatus using wavelet-transformation as an implementation of the digital-watermark embedding apparatus according to the second embodiment.

As a first specific implementation of the digital-watermark embedding apparatus 20, a digital-watermark embedding apparatus 20' using wavelet-transformation is now described with reference to FIG. 4.

The digital-watermark embedding apparatus 20' includes the adder 22, the amplifiers 23a and 23b, the subtractor 24, and the embedding unit 26, as described above, as well as a wavelet transformer 21' embodying the transformer 21, and an inverse wavelet transformer 25' embodying the inverse transformer 25.

The wavelet transformer 21' performs wavelet-transformation on the original image data I to determine wavelet coefficients belonging to four frequency domains LL, HL, LH, and HH. The wavelet transformer 21' may use any filter coefficient for the wavelet transformation, and the specific form is not limited. Rather than all of the determined wavelet coefficients belonging to the four frequency domains LL, HL, LH, and HH, the wavelet transformer 21' only supplies, as frequency-coefficient data $I_F$, either the wavelet coefficient belonging to the frequency domain LL or the wavelet coefficient belonging to the frequency domain HH to both the adder 22 and the amplifier 23a. In other words, the wavelet transformer 21' supplies, as frequency-coefficient data $I_F$, either the low-frequency component in the luminance of the original image data I, which is obtained by a predetermined low-pass filter, or the high-frequency component in the luminance of the original image data I, which is obtained by a predetermined high-pass filter, to both the adder 22 and the amplifier 23a.

The inverse wavelet transformer 25' performs inverse wavelet-transformation on the modified additional data $WM_A$ supplied from the subtractor 24, which is inverse to the wavelet-transformation performed by the wavelet transformer 21', to find modified additional data $WM_A'$ in the original time-domain or space-domain form. The inverse wavelet transformer 25' does not necessarily output the same frequency component as the frequency component output as the frequency-coefficient data $I_F$ by the wavelet transformer 21'; it may output a different frequency component. For instance, in the digital-watermark embedding apparatus 20, if the wavelet transformer 21' outputs a wavelet coefficient having the high-frequency component belonging to the frequency domain HH as the frequency-coefficient data $I_F$, while the inverse wavelet transformer 25' outputs a wavelet coefficient having the low-frequency component belonging to the frequency domain LL as the modified additional data $WM_A'$, the additional data WM is modulated based on the high-frequency component in the original image data I, and is embedded into the low-frequency component in the original image data I. In the digital-watermark embedding apparatus 20, if the wavelet transformer 21' outputs a wavelet coefficient having the high-frequency component belonging to the frequency domain HH as the frequency-coefficient data $I_F$ while the inverse wavelet transformer 25' also outputs a wavelet coefficient having the high-frequency component belonging to the frequency domain HH as the modified additional data $WM_A'$, the additional data WM is modulated based on the high-frequency component in the original image data I, and is embedded into the high-frequency component in the original image data I. However, it is to be understood that the inverse wavelet transformer 25' must perform inverse wavelet-transformation using the same filter coefficient as the filter coefficient used by the wavelet transformer 21'.

More specifically, the digital-watermark embedding apparatus 20' embeds the additional data WM into the original image data I by the following processing. It is assumed herein that the additional data WM is embedded into the wavelet coefficient belonging to the frequency domain LL, and that the amount of change is set to be proportional to the absolute value of the wavelet coefficient belonging to the frequency domain HH. It is further assumed herein that the original image data has 16 pixels in the vertical dimension and 16 pixels in the horizontal dimension, while the additional data WM to be embedded has 8 bits in the vertical dimension and 8 bits in the horizontal dimension.

In the digital-watermark embedding apparatus 20', the wavelet coefficient belonging to the frequency domain HH is supplied as the frequency-coefficient data $I_F$ by the wavelet transformer 21' to both the adder 22 and the amplifier 23a. If the frequency-coefficient data $I_F$ and additional data WM to be embedded corresponding to each pixel (x, y) are set as HH(x, y) and WM(x, y), respectively, where x, y=1, 2, 3, . . . , or 8, then the amplified original coefficient data I'(x, y), the amplified coefficient data $I_W'$(x, y), and the modified additional data $WM_A$(X, y) output from the amplifiers 23a and 23b, and from the subtractor 24 are expressed by the following Equations (9) to (11), respectively:

$$I'(x,y)=HH(x,y)^2/2 \qquad (9)$$

$$I'_W(x,y)=(HH(x,y)+\beta \cdot WM(x,y))^2 \qquad (10)$$

$$WM_A(x,y)=\beta \cdot HH(x,y) \cdot WM(x,y)+\beta^2 \cdot WM(x,y)^2/2 \qquad (11)$$

In the digital-watermark embedding apparatus 20', a matrix in which all elements having the same size as the original image data I are initialized to zero is prepared, and the element positioned at the same location in the matrix as the region occupied by the wavelet coefficient belonging to the frequency domain LL is set to the modified additional data $WM_A$ expressed by Equation (11), obtained by the subtractor 24. The inverse wavelet transformer 25' performs inverse wavelet-transformation on this matrix.

Figure 5A:
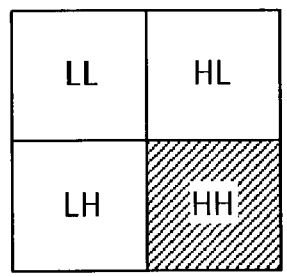
FIGS. 5A and 5B are diagrams of wavelet coefficients to be processed by a wavelet transformer and an inverse wavelet transformer in the digital-watermark embedding apparatus, respectively.
Figure 5B:
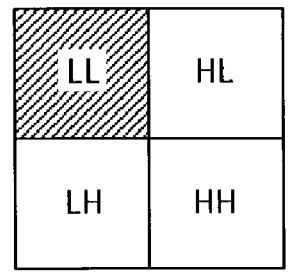

In the digital-watermark embedding apparatus 20', the wavelet coefficient to be processed by the wavelet transformer 21' is a wavelet coefficient belonging to the frequency domain HH, as depicted in FIG. 5A, out of the four quadrate frequency domains LL, HL, LH, and HH, and the wavelet coefficient to be processed by the inverse wavelet transformer 25' is a wavelet coefficient belonging to the frequency domain LL depicted in FIG. 5B.

In the digital-watermark embedding apparatus 20', the modified additional data $WM_A'$ obtained by the inverse wavelet transformer 25' is embedded into the original image data I by the embedder 26, resulting in image data M to be output. The output image data M is equivalent to data obtained by modulating the additional data WM with the absolute value of the high-frequency component in the original image data I and by embedding the modulated additional data WM into the low-frequency component in the original image data I.

The digital-watermark embedding apparatus 20' therefore uses a wavelet-transform technique to change the embedding strength of the additional data WM so as to be proportional to the absolute value of the wavelet coefficient belonging to the frequency domain HH, and embeds the additional data WM into the wavelet coefficient belonging to the frequency domain LL. Accordingly, the digital-watermark embedding apparatus 20' can quickly and easily embed additional data WM having high performance such as robustness to attacks into original image data I.

Figure 6:
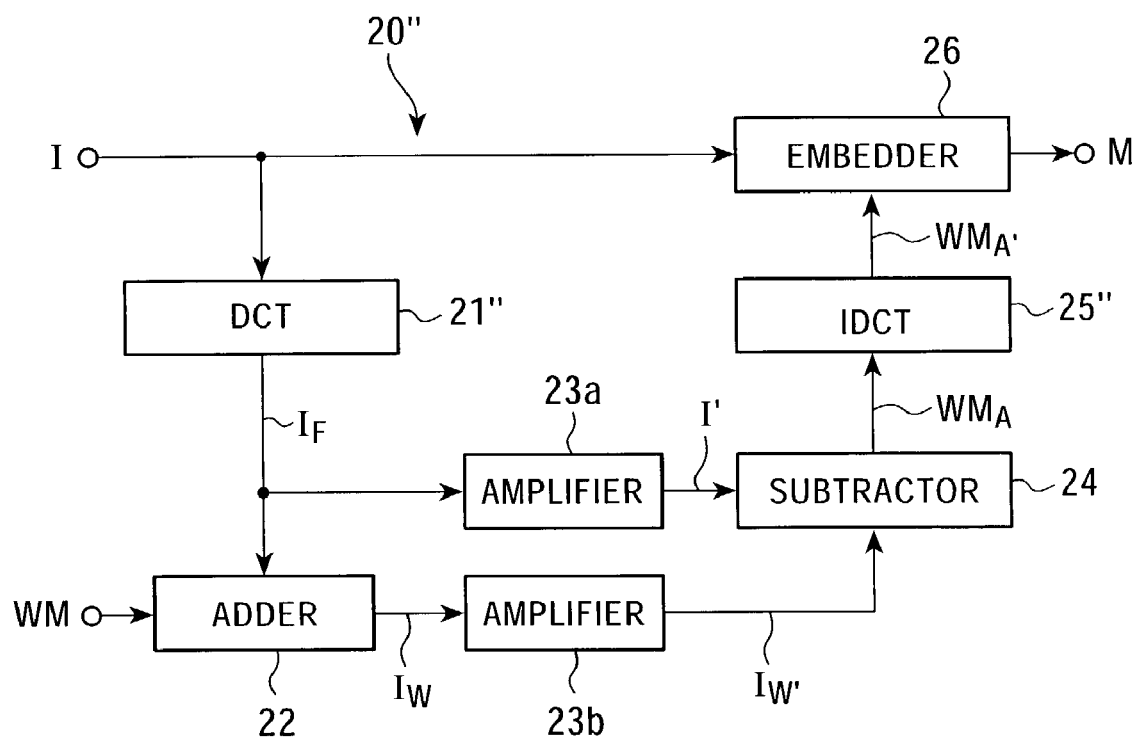
FIG. 6 is a block diagram of a digital-watermark embedding apparatus using DCT as an implementation of the digital-watermark embedding apparatus according to the second embodiment.

As a second specific implementation of the digital-watermark embedding apparatus 20, a digital-watermark embedding apparatus 20" using DCT is now described with reference to FIG. 6. It is assumed herein that an 8×8 DCT is performed on original image data I to embed additional data WM into a DCT coefficient positioned at (3, 3) in each of the resulting blocks, while the amount of change is set so as to be proportional to the absolute value of the DCT coefficient positioned at (8, 8) in each block. It is further assumed herein that the original image data I has 16 pixels vertically and 16 pixels horizontally (2×2 blocks), while the additional data WM to be embedded has 2 bits vertically and 2 bits horizontally.

The digital-watermark embedding apparatus 20" includes the adder 22, the amplifiers 23a and 23b, the subtractor 24, and the embedding unit 26, as described above, as well as a DCT unit 21" embodying the transformer 21, and an IDCT (inverse discrete cosine transform) unit 25" embodying the inverse transformer 25.

The DCT unit 21" divides the original image data I (16×16 pixels) into 2×2 blocks each having 8×8 pixels to perform DCT on each block. Rather than all of the resulting DCT coefficients, the DCT unit 21" supplies, as frequency-coefficient data $I_F$, the absolute values of four DCT coefficients positioned at (8, 8) in the respective blocks to both the adder 22 and the amplifier 23a.

The IDCT unit 25" performs IDCT on the modified additional data $WM_A$ supplied from the subtractor 24, which is inverse to the DCT performed by the DCT unit 21", to find modified additional data $WM_A'$ in the original time-domain or space-domain form. The IDCT unit 25" then supplies to the embedder 26, as the modified additional data $WM_A'$, components of the result subjected to IDCT which correspond to the four DCT coefficients positioned at (3, 3) in the respective blocks output from the DCT unit 21".

More specifically, the digital-watermark embedding apparatus 20" embeds the additional data WM into the original image I by the following processing.

In the digital-watermark embedding apparatus 20", as described above, the absolute values of the four DCT coefficients positioned at (8, 8) in the respective blocks are supplied as the frequency-coefficient data $I_F$ by the DCT unit 21" to both the adder 22 and the amplifier 23a. If the frequency-coefficient data $I_F$ corresponding to each block k is indicated by C(k), and the four-bit additional data WM to be embedded is indicated by WM(k), where k=1, 2, 3, or 4, the amplified original coefficient data I'(k), the amplified coefficient data $I_W'$(k), and the modified additional data $WM_A$(k) output from the amplifiers 23a and 23b, and from the subtractor 24 are expressed by the following Equations (12) to (14), respectively:

$$I'(k)=C(k)^2/2 \qquad (12)$$

$$I'_W(k)=(C(k)+\beta \cdot WM(k))^2 \qquad (13)$$

$$WM_A(k)=\beta \cdot C(k) \cdot WM(k)+\beta^2 \cdot WM(k)^2/2 \qquad (14)$$

In the digital-watermark embedding apparatus 20", a matrix in which all elements having the same size as the original image data I are initialized to zero is prepared, and the matrix is divided into 8×8 blocks. The element positioned at (3, 3) in each block is set to the modified additional data $WM_A$ expressed by Equation (14), obtained by the subtractor 24. The IDCT unit 25" performs IDCT on this matrix.

Figure 7A:
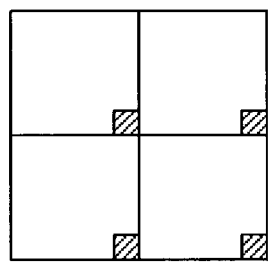
FIGS. 7A and 7B are diagrams of DCT coefficients to be processed by a DCT unit and an IDCT unit in the digital-watermark embedding apparatus, respectively.
Figure 7B:
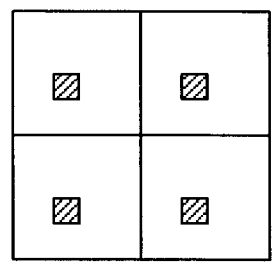

In the digital-watermark embedding apparatus 20", the DCT coefficient to be processed by the DCT unit 21" is a DCT coefficient positioned at (8, 8) in each of the four quadrate blocks, as depicted in FIG. 7A, and the DCT coefficient to be processed by the IDCT unit 25" is a DCT coefficient positioned at (3, 3) in each of the four blocks, as depicted in FIG. 7B.

In the digital-watermark embedding apparatus 20", the modified additional data $WM_A'$ obtained by the IDCT unit 25" is embedded into the original image data I by the embedder 26, resulting in image data M to be output. The output image data M is equivalent to a value obtained by modulating the additional data WM with the absolute value of the DCT coefficient positioned at (8, 8) in each block of the original image I and by embedding the modulated additional data WM into the DCT coefficient positioned at (3, 3) in each block of the original image data I.

The digital-watermark embedding apparatus 20" therefore uses DCT to change the embedding strength of the additional data WM so as to be proportional to the absolute value of the DCT coefficient positioned at (8, 8) in each block, and embeds the additional data WM into the DCT coefficient positioned at (3, 3) in each block. Accordingly, the digital-watermark embedding apparatus 20" can quickly and easily embed additional data WM having high performance such as robustness to attacks into original image data I.

Figure 8:
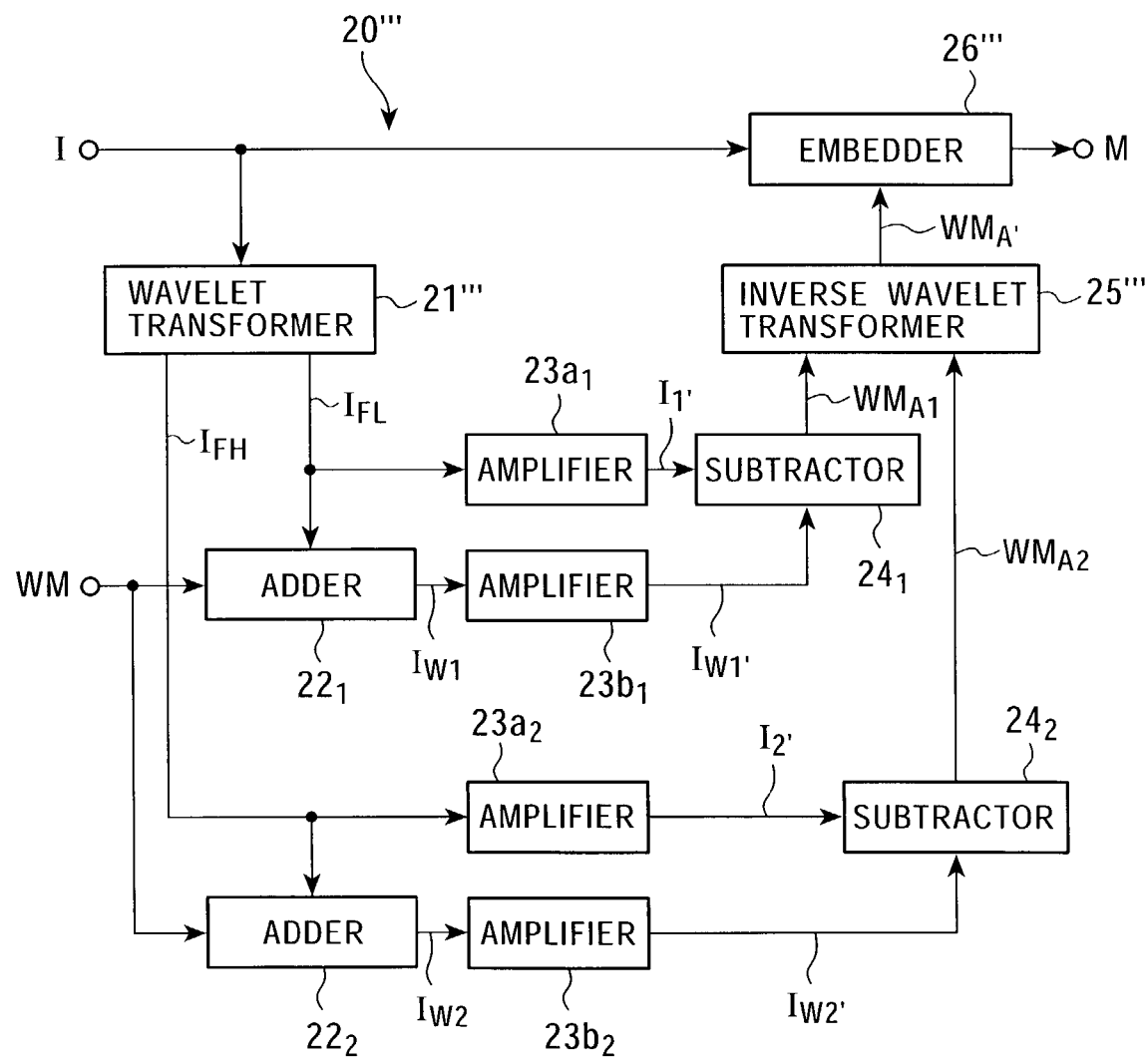
FIG. 8 is a block diagram of a digital-watermark embedding apparatus using wavelet-transformation as an extended implementation of the digital-watermark embedding apparatus according to the second embodiment.
Figure 9:
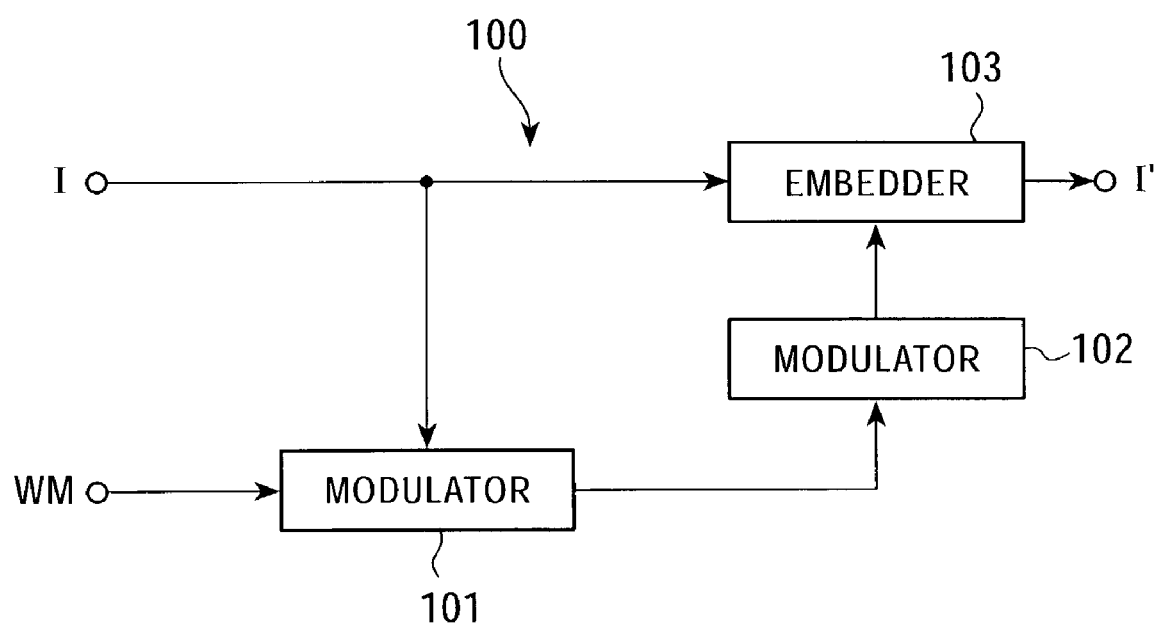
FIG. 9 is a block diagram of a digital-watermark embedding apparatus in the related art.

As a specific extension of the digital-watermark embedding apparatus 20, a digital-watermark embedding apparatus 20''' using wavelet-transformation is now described with reference to FIG. 8.

The digital-watermark embedding apparatus 20''' includes a wavelet transformer 21''' embodying the transformer 21, two adders $22_1$ and $22_2$ embodying the adder 22, two sets of amplifiers $23a_1$ and $23b_1$, and $23a_2$ and $23b_2$ embodying the amplifiers 23a and 23b, respectively, two subtractors $24_1$ and $24_2$ embodying the subtractor 24, an inverse wavelet transformer 25''' embodying the inverse transformer 25, and an embedder 26''' embodying the embedder 26.

The wavelet transformer 21''' performs wavelet-transformation on original image data I to find wavelet coefficients belonging to four frequency domains LL, HL, LH, and HH. The wavelet transformer 21''' supplies, as frequency-coefficient data $I_{FL}$, the wavelet coefficient belonging to the frequency domain LL, out of the wavelet coefficients belonging to the four frequency domains LL, HL, LH, and HH, to both the adder $22_1$ and the amplifier $23a_1$, and also supplies, as frequency-coefficient data $I_{FH}$, the wavelet coefficient belonging to the frequency domain HH to both the adder $22_2$ and the amplifier $23a_2$. In other words, the wavelet transformer 21''' supplies, as frequency-coefficient data $I_{FL}$, the low-frequency component in the luminance of the original image data I, which is obtained by a predetermined low-pass filter, to both the adder $22_1$ and the amplifier $23a_1$, and supplies, as frequency-coefficient data $I_{FH}$, the high-frequency component in the luminance of the original image data I, which is obtained by a predetermined high-pass filter, to both the adder $22_2$ and the amplifier $23a_2$.

Similarly to the adder 22, the adder $22_1$ sums the frequency-coefficient data $I_{FL}$ supplied from the wavelet transformer 21''' and the additional data WM. The adder $22_1$ supplies the resulting summed coefficient data $I_{W1}$ to the amplifier $23b_1$.

Similarly to the adder 22, the adder $22_2$ sums the frequency-coefficient data $I_{FH}$ supplied from the wavelet transformer 21''' and the additional data WM. The adder $22_2$ supplies the resulting summed coefficient data $I_{W2}$ to the amplifier $23b_2$.

Similarly to the amplifiers 23a and 23b, each of the amplifiers $23a_1$ and $23b_1$ exhibits a non-linear input-output characteristic. The amplifier $23a_1$ amplifies the frequency-coefficient data $I_{FL}$ according to a predetermined characteristic. The amplifier $23b_1$ amplifies the summed frequency-coefficient data $I_{W1}$ supplied from the adder $22_1$ according to a predetermined characteristic. The amplifier $23a_1$ supplies the resulting amplified original coefficient data $I_2'$ to the subtractor $24_1$, and the amplifier $23b_1$ supplies the amplified coefficient data $I_{W1}'$ to the subtractor $24_1$.

Similarly to the amplifiers 23a and 23b, each of the amplifiers $23a_2$ and $23b_2$ exhibits a non-linear input-output characteristic. The amplifier $23a_2$ amplifies the frequency-coefficient data $I_{FH}$ according to a predetermined characteristic. The amplifier $23b_2$ amplifies the summed frequency-coefficient data $I_{W2}$ supplied from the adder $22_2$ according to a predetermined characteristic. The amplifier $23a_2$ supplies the resulting amplified original coefficient data $I_2'$ to the subtractor $24_2$, and the amplifier $23b_2$ supplies the amplified coefficient data $I_{W2}'$ to the subtractor $24_2$.

Similarly to the subtractor 24, the subtractor $24_1$ takes the difference between the amplified coefficient data $I_{W1}'$ and the amplified original coefficient data $I_1'$. As a result, the output from the subtractor $24_1$ is the modified additional data $WM_{A1}$ obtained by modifying the waveform of the additional data WM according to the luminance of the original image data I. The modified additional data $WM_{A1}$ is supplied to the inverse wavelet transformer 25'''.

Similarly to the subtractor 24, the subtractor $24_2$ takes the difference between the amplified coefficient data $I_{W2}'$ and the amplified original coefficient data $I_2'$. As a result, the output from the subtractor $24_2$ is the modified additional data $WM_{A2}$ obtained by modifying the waveform of the additional data WM according to the edge component in the original image data I. The modified additional data $WM_{A2}$ is supplied to the inverse wavelet transformer 25'''.

The inverse wavelet transformer 25''' performs inverse wavelet-transformation on both the modified additional data $WM_{A1}$ supplied from the subtractor $24_1$ and the modified additional data $WM_{A2}$ supplied from the subtractor $24_2$ to find modified additional data $WM_A'$ in the original time-domain or space-domain form. A matrix in which all elements having the same size as the original image data I are initialized to zero is prepared, and the element positioned at the same location in the matrix as the region occupied by the wavelet coefficient belonging to the frequency domain LL is set to the modified additional data $WM_{A1}$ obtained by the subtractor $24_1$, while the element positioned at the same location in the matrix as the region occupied by the wavelet coefficient belonging to the frequency domain HH is set to the modified additional data $WM_{A2}$ obtained by the subtractor $24_2$. The wavelet inverse transformer 25''' performs inverse wavelet-transformation on this matrix. The inverse wavelet transformer 25''' supplies the resulting modified additional data $WM_A'$ to the embedder 26'''.

Similarly to the embedder 26, the embedder 26''' embeds the modified additional data $WM_A'$ supplied from the inverse wavelet transformer 25''' into the original image data I, and outputs the resulting data as image data M.

The digital-watermark embedding apparatus 20''' therefore uses a wavelet-transform technique to change the embedding strength of the additional data WM according to both the luminance and the edge component of the original image data I, and embeds the additional data WM into the original image data I. Accordingly, the digital-watermark embedding apparatus 20''' can quickly and easily embed additional data WM having high performance such as robustness to attacks into original image data I.

As described above, a digital-watermark embedding apparatus according to the present invention uses a non-linear circuit to perform waveform-transformation on additional data WM according to the visual characteristics of original image data I, before embedding the additional data WM, thereby changing the embedding strength of the additional data WM without performing multiplication or functional equation, unlike the technique disclosed in the U.S. Pat. No. 5,748,763 assigned to Digimarc Corporation, while quickly and easily processing the additional data WM having high performance such as robustness to attacks. Therefore, a digital-watermark embedding apparatus according to the present invention contributes to prevention of illegal copying of the original image data I, which is beneficial to users.

The present invention is not limited to the illustrated embodiments. For example, if an amplifier exhibiting an input-output characteristic expressed by a second- or higher-order function is used, a low-pass filter for causing a predetermined frequency component to pass and for removing a weak component or high-order component may be placed after a subtractor, so that the modified additional data filtered by the low-pass filter may be embedded into the original image data.

While the illustrated embodiments have been discussed in the context of a transformer for performing frequency-transformation on original image data, a transformer for level-shifting original image data, or a transformer for performing various frequency-transformation and/or level-shifting operation or a combination thereof on original image data may also be used in the present invention.

In the illustrated embodiments, a digital watermark embedded in image data is detected; however, it is anticipated that the present invention may be readily applied to the case where two-dimensional data other than image data, one-dimensional data such as audio data, or three-dimensional data such as stereoimage data is used as original data.

It is to be understood that a variety of modifications may be made without departing from the spirit and scope of the invention.

What is claimed is:

1. An additional-data embedding apparatus for embedding predetermined additional data into original data, comprising:
   adding means for summing the original data and the additional data so as to obtain summed data;
   first amplifying means for amplifying the original based upon a predetermined nonlinear input-output characteristic so as to obtain amplified original data;
   second amplifying means for amplifying the summed data supplied from the adding means based upon the predetermined nonlinear input-output characteristic so as to obtain amplified summed data;
   subtracting means for taking a difference between the amplified summed data obtained from the second amplifying means and the amplified original data obtained from the first amplifying means so as to obtain modified additional data; and
   embedding means for embedding the modified additional data supplied from the subtracting means into the original data.

2. The additional-data embedding apparatus according to claim 1, further comprising:
   storing means for storing, as a reference amplifier values of the first amplifying means and the second amplifying means for the original data and the additional data, respectively,
   wherein the first amplifying means refers to the reference table stored in the storing means to amplify the original data, and the second amplifying means refers to the reference table stored in the storing means to amplify the summed data.

3. The additional-data embedding apparatus according to claim 1, wherein the input-output characteristic of each of the first amplifying means and the second amplifying means is designed so as to satisfy a predetermined integrated result of a waveform-modified version of the additional data.

4. The additional-data embedding apparatus according to claim 1, further comprising:
   low-pass filtering means for passing a predetermined frequency component in input data,
   wherein, when the first amplifying means and the second amplifying means each exhibit a nonlinear input-output characteristic expressed by one of a second-order and a higher-order function, the embedding means embeds portions of the modified additional data output from the subtracting means, which is filtered by the low-pass filtering means and in which a high-order component is removed, into the original data.

5. An additional-data embedding method of embedding predetermined additional data into original data, comprising:
   an adding step of summing the original data and the additional data so as to obtain summed data;
   a first amplifying step of amplifying the original data based upon a predetermined nonlinear input-output characteristic so as to obtain amplified original data;
   a second amplifying step of amplifying the summed data obtained in the adding step based on a predetermined nonlinear input-output characteristic so as to obtain amplified summed data;
   a subtracting step of taking a difference between the amplified summed data obtained in the second amplifying step and the amplified original data obtained in the first amplifying step so as to obtain modified additional data; and
   an embedding step of embedding the modified additional data obtained in the subtracting step into the original data.

6. The additional-data embedding method according to claim 5, wherein amplifier values for the first amplifying step and the second amplifying step with respect to the original data and the additional data, respectively, are stored as a reference table in a storing means; and
   the reference table stored in the storing means is referred to in the first amplifying step to amplify the original data, and the reference table stored in the storing means is referred to in the second amplifying step to amplify the summed data.

7. The additional-data embedding method according to claim 5, wherein the input-output characteristic for each of the first amplifying step and the second amplifying step is designed so as to satisfy a predetermined integrated result of a waveform-modified version of the additional data.

8. The additional-data embedding method according to claim 5, further comprising:
   a low-pass filtering step of passing a predetermined frequency component in input data,
   wherein, in the embedding step, when amplification is performed with a nonlinear input-output characteristic expressed by one of a second-order and a higher-order function in each of the first amplifying step and the second amplifying step, a portion of the modified additional data obtained in the subtracting step, which is filtered in the low-pass filtering step and in which a high-order component is removed, is embedded into the original data.

9. An additional-data embedding apparatus data, comprising:
   transforming means for performing predetermined transformation of the original data;
   adding means for summing transformed data obtained from the transforming means and the additional data so as to obtain summed data;

first amplifying means for amplifying the transformed data based on a predetermined nonlinear input-output characteristic so as to obtain amplified transformed data;

second amplifying means for amplifying the summed data supplied from the adding means based on a predetermined nonlinear input-output characteristic so as to obtain amplified summed data;

subtracting means for taking a difference between the amplified summed data obtained from the second amplifying means and the amplified transformed data obtained from the first amplifying means so as to obtain modified additional data;

inverse transforming means for performing inverse transformation on the modified additional data obtained from the subtracting means, the inverse transformation being inverse to the transformation performed by the transforming means; and embedding means for embedding the modified additional data obtained from the inverse transforming means into the original data.

10. The additional-data embedding apparatus according to claim 9, wherein the transforming means performs predetermined frequency-transformation on the original data in one of a time domain and a space domain; and the adding means sums the transformed data obtained by the frequency-transformation performed by the transforming means and the additional data that is a frequency-domain signal in the transforming means, the transformed data comprising frequency coefficients.

11. The additional-data embedding apparatus according to claim 10, wherein the transforming means selects a specific frequency coefficient in the frequency coefficients, and outputs the specific frequency coefficient as the transformed data.

12. The additional-data embedding apparatus according to claim 9, wherein the transforming means level-shifts the original data.

13. The additional-data embedding apparatus according to claim 9, further comprising:

storage means for storing, as a reference table, amplifier values of the first amplifying means and the second amplifying means f or the original data and the additional data, respectively, wherein the first amplifying means refers to the reference table stored in the storing means to amplify the transformed data, and the second amplifying means refers to the reference table stored in the storing means to amplify the summed data.

14. The additional-data embedding apparatus according to claim 9, wherein the input-output characteristic of each of the first amplifying means and the second amplifying means is designed so as to satisfy a desired integrated result of the waveform-modified version of the additional data.

15. The additional-data embedding apparatus according to claim 9, further comprising:

low-pass filtering means for passing a predetermined frequency component in input data, wherein, when the first amplifying means and the second amplifying means each exhibit a nonlinear input-output characteristic expressed by one of a second-order and higher-order function, the inverse transforming means performs inverse-transformation on a portion of the modified additional data output from the subtracting means, which is filtered by the low-pass filtering means and in which a high-order component is removed.

16. An additional-data embedding method of embedding predetermined additional data into original data, comprising:

a transforming step of performing a predetermined transformation of the original data;

an adding step of summing transformed data obtained by the predetermined transformation performed in the transforming step and the additional data so as to obtain summed data;

a first amplifying step of amplifying the transformed data based on a predetermined nonlinear input-output characteristic so as to obtain amplified transformed data;

a second amplifying step of amplifying the summed data obtained in the adding step based upon a predetermined nonlinear input-output characteristic so as to obtain amplified summed data;

a subtracting step of taking a difference between the amplified summed data obtained in the second amplifying step and the amplified transformed data obtained in the first amplifying step so as to obtain modified additional data;

an inverse transforming step of performing an inverse transformation of the modified additional data obtained in the subtracting step, the inverse transformation being inverse to the transformation performed in the transforming step; and an embedding step of embedding the modified additional data obtained in the inverse transforming step into the original data.

17. The additional-data embedding method according to claim 16, wherein, in the transforming step, frequency-transformation is performed on the original data in one of a time domain and a space domain; and in the adding step, the transformed data obtained by the frequency-transformation performed in the transforming step and the additional data that is a frequency-domain signal in the transforming step are summed, the transformed data comprising frequency coefficients.

18. The additional-data embedding method according to claim 17, wherein, in the transforming step, a specific frequency coefficient in the frequency coefficients is output as the transformed data.

19. The additional-data embedding method according to claim 16, wherein the original data is level-shifted in the transforming step.

20. The additional-data embedding method according to claim 16, wherein amplifier values for the first amplifying step and the second amplifying step with respect to the original data and the additional data, respectively, are stored as a reference table in a storing means; and the reference table stored in the storing means is referred to in the first amplifying step to amplify the transformed data, and the reference table stored in the storing means is referred to in the second amplifying step to amplify the summed data.

21. The additional-data embedding method according to claim 16, wherein the input-output characteristic for each of the first amplifying step and the second amplifying step is designed so as to satisfy a predetermined integrated result of a waveform-modified version of the additional data.

22. The additional-data embedding method according to claim 16, further comprising:

a low-pass filtering step of passing a predetermined frequency component in data input thereto, wherein, in the inverse transforming step, when amplification is performed with a nonlinear input-output characteristic expressed by one of a second-order and a higher-order function in each of the first amplifying step and the second amplifying step, inverse-transformation is performed on portion of the modified additional data obtained in the subtracting step, which is filtered in the low-pass filtering step and in which a high-order component is removed.

* * * * *

UNITED STATES PATENT AND TRADEMARK OFFICE
CERTIFICATE OF CORRECTION

PATENT NO. : 7,257,710 B2
APPLICATION NO. : 10/223532
DATED : August 14, 2007
INVENTOR(S) : Jun Hirai and Yoonki Choi It is certified that error appears in the above-identified patent and that said Letters Patent is hereby corrected as shown below:

ON THE TITLE PAGE, ITEM [57] IN THE ABSTRACT:

Line 1, delete "The present invention provides";

Line 1, "an" should read -- An --;

Line 7, "non-linear" should read -- nonlinear --;

Line 9, "non-linear" should read -- nonlinear --;

Line 13, "data which is" should read -- data that is --;

Line 15, "which is supplied" should read -- that is supplied --;

Column 4, line 43, "embedding into" should read -- embedded into --;

Column 7, line 52, "to attack by" should read -- to attacks by --;

Column 9, line 51, "to attack by" should read -- to attacks by --;

Column 15, line 37, "original based" should read -- original data based --;

Column 15, line 54, "amplifier values" should read -- amplifier, values --;

Column 17, line 41, "means f or the" should read -- means for the --;

Column 18, line 62, "on portion" should read -- on a portion --.

Signed and Sealed this

Second Day of March, 2010

David J. Kappos
*Director of the United States Patent and Trademark Office*